US012574572B2

(12) United States Patent (10) Patent No.: US 12,574,572 B2

Hwang (45) Date of Patent: Mar. 10, 2026

(54) METHOD AND APPARATUS FOR GENERATING VIDEO STREAM

(71) Applicant: ALTIMEDIA CORPORATION, Seoul (KR)

(72) Inventor: Tae Youn Hwang, Siheung-si (KR)

(73) Assignee: ALTIMEDIA CORPORATION, Seoul (KR)

( * ) Notice: Subject to any disclaimer, the term of this patent is extended or adjusted under 35 U.S.C. 154(b) by 7 days.

(21) Appl. No.: 18/957,574

(22) Filed: Nov. 22, 2024

(65) Prior Publication Data

US 2025/0175656 A1 May 29, 2025

(30) Foreign Application Priority Data

Nov. 23, 2023 (KR) ........................ 10-2023-0164491

(51) Int. Cl.
   *H04N 21/234* (2011.01)
   *H04N 21/81* (2011.01)

(52) U.S. Cl.
   CPC ....... *H04N 21/234* (2013.01); *H04N 21/8146* (2013.01); *H04N 21/816* (2013.01)

(58) Field of Classification Search
   None
   See application file for complete search history.

(56) References Cited

U.S. PATENT DOCUMENTS

2009/0031036 A1    1/2009 Hong et al.
2015/0281749 A1*  10/2015 Hutchison ................. G06T 5/90
                                                            348/164
2025/0363733 A1*  11/2025 Hamada .................. G06T 15/04

FOREIGN PATENT DOCUMENTS

KR    10-2009-0011717 A    2/2009
KR    10-2022-0003249 A    1/2022
KR         10-2442552 B1    9/2022
KR         10-2454406 B1   10/2022
KR    10-2023-0137535 A   10/2023

OTHER PUBLICATIONS

Office Action for KR 10-2023-0164491 by Korean Intellectual Property Office dated Sep. 19, 2025.

* cited by examiner

*Primary Examiner* — James R Marandi
(74) *Attorney, Agent, or Firm* — BROADVIEW IP LAW, PC

(57) ABSTRACT

Disclosed are a video stream generation method and a video stream generation apparatus, and a video stream generation method of generating video streams capable of reproducing temperature of scenes within a video according to an embodiment of the present disclosure may include receiving video data and temperature data for scenes included within the video data, generating temperature meta information by dividing each frame included in the video data into sections and configuring representative temperature of the sections, based on the temperature data distributed within the sections, and generating video streams by performing compression such that each frame within the video data further includes the temperature meta information.

12 Claims, 6 Drawing Sheets

Figure 5:
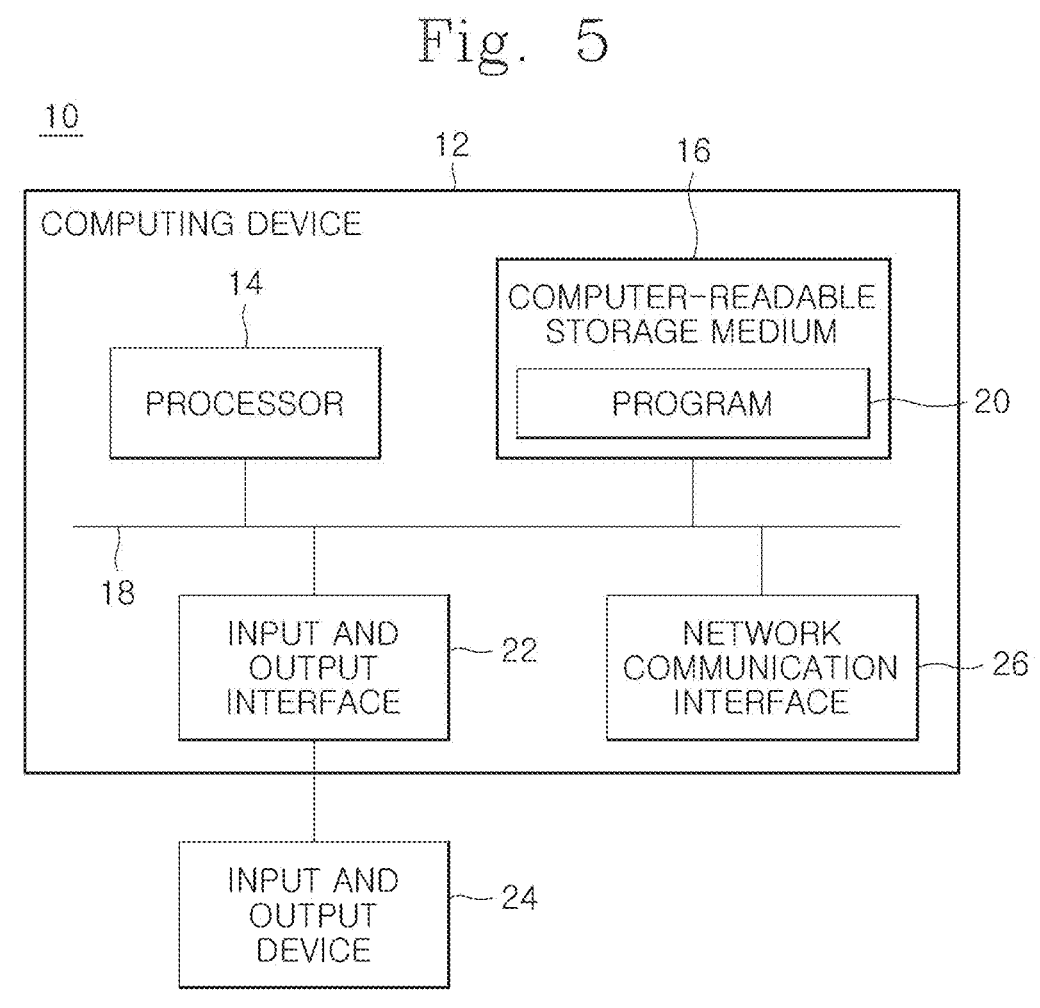

COMPUTING DEVICE

14

PROCESSOR

COMPUTER-READABLE
STORAGE MEDIUM

PROGRAM

20

18

INPUT AND
OUTPUT
INTERFACE

22

NETWORK
COMMUNICATION
INTERFACE

26

INPUT AND
OUTPUT
DEVICE

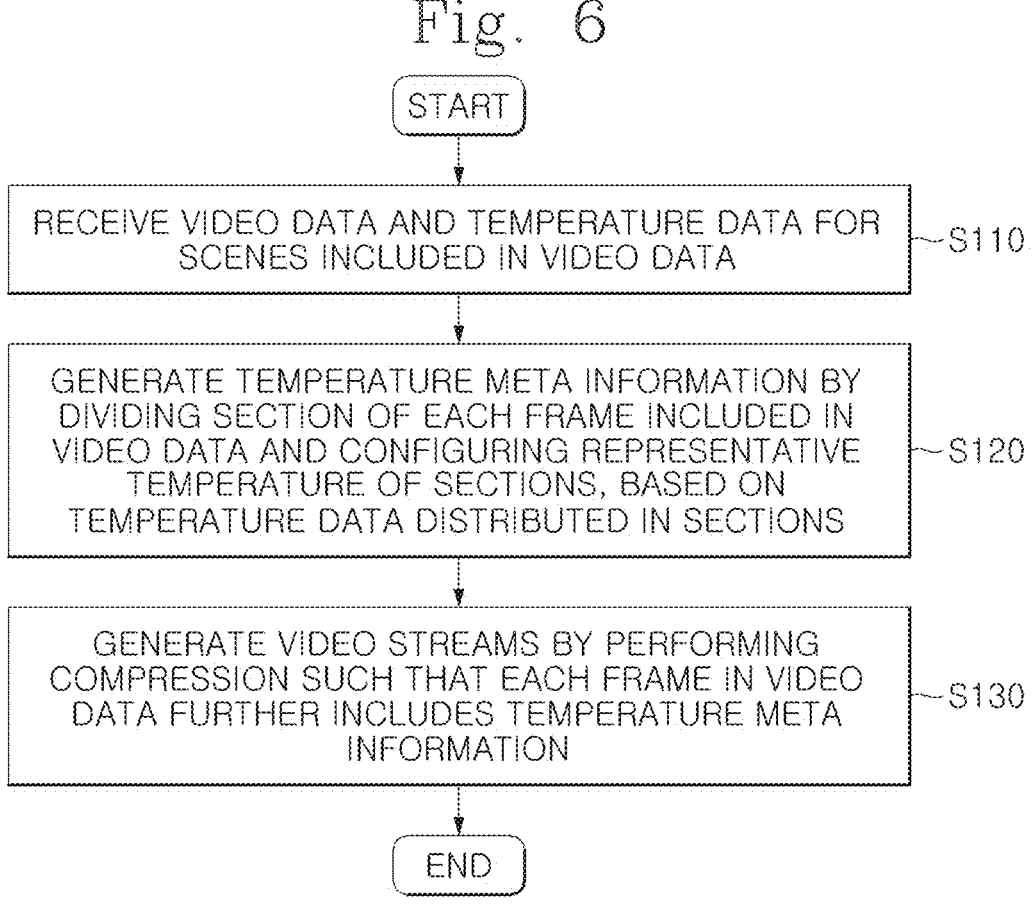

START

RECEIVE VIDEO DATA AND TEMPERATURE DATA FOR SCENES INCLUDED IN VIDEO DATA ~S110

GENERATE TEMPERATURE META INFORMATION BY DIVIDING SECTION OF EACH FRAME INCLUDED IN VIDEO DATA AND CONFIGURING REPRESENTATIVE TEMPERATURE OF SECTIONS, BASED ON TEMPERATURE DATA DISTRIBUTED IN SECTIONS ~S120

GENERATE VIDEO STREAMS BY PERFORMING COMPRESSION SUCH THAT EACH FRAME IN VIDEO DATA FURTHER INCLUDES TEMPERATURE META INFORMATION ~S130

END

METHOD AND APPARATUS FOR GENERATING VIDEO STREAM

CROSS-REFERENCE TO RELATED APPLICATION(S)

This application is based on and claims priority under 35 U.S.C. 119 to Korean Patent Application No. 10-2023-0164491, filed on Nov. 23, 2023, in the Korean Intellectual Property Office, the disclosure of which is herein incorporated by reference in its entirety.

BACKGROUND OF THE INVENTION

1. Field of the Invention

The present disclosure relates to a video stream generation method and a video stream generation apparatus capable of generating video streams including temperature meta information to reproduce temperature for scenes shown in a video.

2. Description of the Prior Art

With the recent development of digital multimedia, audiovisual media having dramatically improved picture and sound quality are being provided. In terms of picture quality, high definition (HD) broadcasting has become possible, and thus a screen with five times more pixels than analog broadcasting is provided, and in terms of sound quality, 5.1 channel surround sound has been provided, and thus it is possible to provide broadcasts with a sense of realism.

These broadcasting technologies are evolving in a direction that can increase the sense of realism and the sense of reality for viewers. When humans interact with their surrounding environments, they can become more immersed in the environments. Accordingly, interaction that is an important factor affecting the sense of reality has been recently attempted in various ways. For example, the interaction is provided through interactive TV that provides viewers with additional information or Internet connection services related to broadcast programs and allows viewers to easily participate in voting conducted in broadcast programs.

However, the existing broadcasting is limited to providing audiovisual information and only considers information-seeking interaction and indirect interaction with media. Direct interaction between viewers and videos helps the viewers become immersed in videos.

Following this trend, video devices are evolving to the form that provides audiovisual information through video information and also delivers information for simulating the five senses such as touch. Sensory information for touch other than the audiovisual information may be transferred from a video device to a touch reproduction device and provided to the user.

Video information is generally provided to the video device in compressed form. Compressed video information is usually configured in the form of mixture of video packets and audio packets. Accordingly, in consideration of the aspect of compatibility, a method of providing tactile information using currently used video streams (for example, transport stream (TS) or program stream (PS)) is required.

SUMMARY OF THE INVENTION

The present disclosure is to provide a video stream generation method and a video stream generation apparatus capable of providing temperature information corresponding to a video that is being reproduced to a user.

The present disclosure is to provide a video stream generation method and a video stream generation apparatus capable of efficiently transmitting temperature data along with video data by performing video compression based on moving picture expert group (MPEG)-2 transport stream (TS).

The present disclosure is to provide a video stream generation method and a video stream generation apparatus capable of providing more accurate temperature information for a selection location of the user.

A video stream generation method of generating video streams capable of reproducing temperature of scenes within a video according to an embodiment of the present disclosure may include receiving video data and temperature data for scenes included within the video data, generating temperature meta information by dividing each frame included in the video data into sections and configuring representative temperature of the sections, based on the temperature data distributed within the sections, and generating video streams by performing compression such that each frame within the video data further includes the temperature meta information.

The receiving may include receiving the temperature data from a thermal imaging sensor synchronized with a video capturing device for generating the video data and configured to capture identical scenes to the video capturing device.

The receiving may include receiving the temperature data corresponding to the video data from a temperature generation model trained to generate temperature data corresponding to an input video, based on video analysis.

The generating of the temperature meta information may include calculating an average value of temperature data corresponding to pixels within the section and configuring the average value as representative temperature of the section.

The generating of the temperature meta information may include sampling the video data at every configured periods and generate the temperature meta information for sampled frames.

The temperature meta information may further include at least one of a sequence number indicating the section, and size information and generation time information of the section.

The generating of the temperature meta information may include receiving selection location information of a user corresponding to the video data and additionally dividing an active section corresponding to the selection location information among the sections into sub sections and additionally configuring representative temperature for the sub sections and generating the temperature meta information.

The additionally dividing may include identifying temperature distribution based on standard deviation of temperature data included within the active section and dividing the sub sections according to the temperature distribution within the active section.

The additionally dividing may include, in case that an average value of differences between representative temperature of the active section and representative temperature of other adjacent sections is larger than or equal to a configured value, maintaining the sub sections within the active section.

The generating of the video streams may include generating the video streams by further including the temperature meta information in a packetized elementary stream (PES) data area, based on moving picture expert group (MPEG-2) transport stream (TS).

According to an embodiment of the present disclosure, it is possible to implement a computer program combined with hardware and stored in a medium in order to execute the video stream generation method.

A video stream generation apparatus for generating video streams capable of reproducing temperature of scenes within a video according to an embodiment of the present disclosure includes a processor, and the processor may be configured to receive video data and temperature data for scenes included within the video data, generate temperature meta information by dividing each frame included in the video data into sections and configuring representative temperature of the sections, based on the temperature data distributed within the sections, and generate video streams by performing compression such that each frame within the video data further includes the temperature meta information.

The technical problems are lists of all the features of the present disclosure. Various features of the present disclosure and advantages and effects according thereto may be understood in more detail with reference to the following detailed embodiments.

In accordance with a video stream generation method and a video stream generation apparatus according to an embodiment of the present disclosure, it is possible to provide a user with temperature information corresponding to a video that is being reproduced, so that the user can more immersed in and view the video.

In accordance with a video stream generation method and a video stream generation apparatus according to an embodiment of the present disclosure, it is possible to perform video compression based on MPET-2 TS and thus efficiently compress and transmit temperature data along with video data. That is, even when temperature data is further included in video data, the amount of transmitted data may be managed and thus efficiently transmitted.

In accordance with a video stream generation method and a video stream generation apparatus according to an embodiment of the present disclosure, it is possible to, when a selection location of the user is detected, further divide the corresponding selection location into sub sections and provide additional temperature information. That is, it is possible to provide more accurate temperature information to the user.

BRIEF DESCRIPTION OF THE DRAWINGS

FIG. 5 is a schematic diagram illustrating a computing device according to an embodiment of the present disclosure.

FIG. 6 is a flowchart illustrating a video stream generation method according to an embodiment of the present disclosure.

Figure 1:
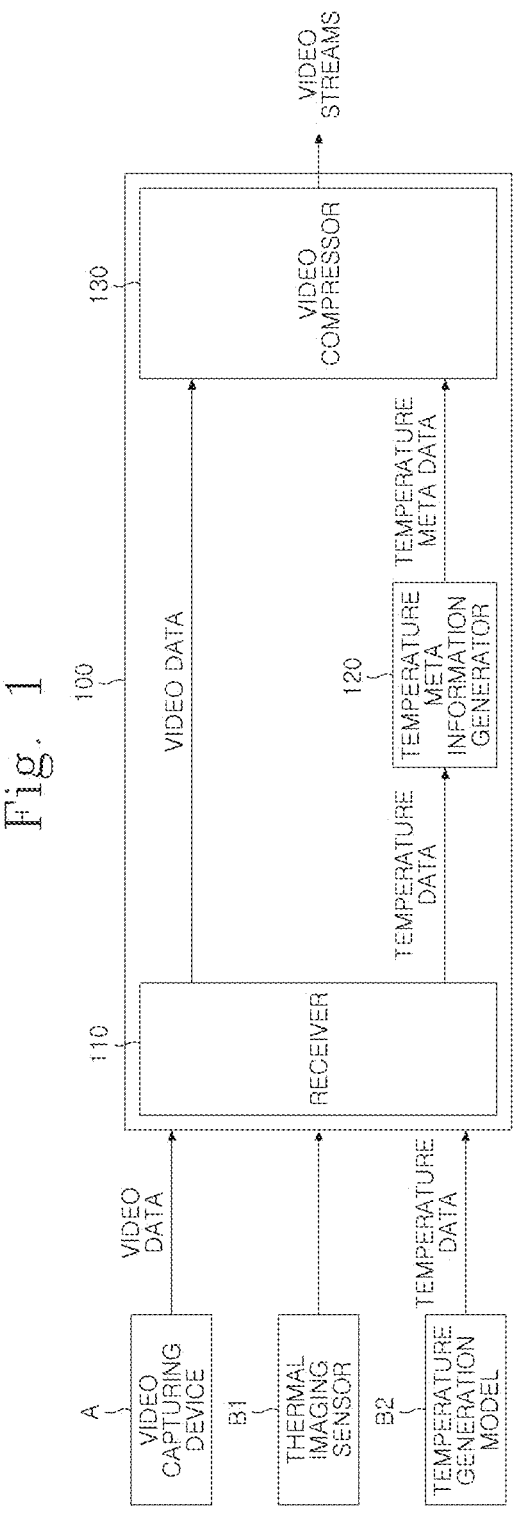
FIG. 1 is a schematic diagram illustrating a video stream generation device according to an embodiment of the present disclosure.

DETAILED DESCRIPTION OF THE
EXEMPLARY EMBODIMENTS

Hereinafter, exemplary embodiments are described in detail with reference to the accompanying drawings to make those skilled in the art to which the present disclosure belongs easily implement the present disclosure. However, in detailed description of the exemplary embodiments of the present disclosure, if it is determined that detailed description of relevant known functions or configurations unnecessarily make the subject of the present disclosure unclear, the detailed description is omitted. Further, the same reference numeral is used for parts that perform similar functions and actions throughout the drawings.

In addition, throughout the specifications, when a part is "connected" to another part, it includes not only the case where the part is "directly connected" to the other part but also the case where the part is "indirectly connected" to the other part via another element therebetween. The term "including" an element may mean that another element may be further included rather than excluding another element unless otherwise specifically stated. The term "er (or unit)", "module", or the like in the specifications may mean the unit to process at least one function or operation, which may be implemented by hardware, software, or a combination of hardware and software.

FIG. 1 is a schematic diagram illustrating a video stream generation device according to an embodiment of the present disclosure.

Referring to FIG. 1, a video stream generation device 100 according to an embodiment may include a receiver 110, a temperature meta information generator 120, and a video compressor 130.

Hereinafter, the video stream generation device according to an embodiment of the present disclosure is described with reference to FIG. 1.

The receiver 110 may receive video data and temperature data on respective scenes included in the video data. That is, the receiver 110 may receive both video data to generate video streams and temperature data corresponding to the corresponding video data.

The receiver 110 may receive video data from a video capturing device A. According to an embodiment, the video data may be provided from a separate server or device that stores the video data generated by the video capturing device A.

Further, the receiver 110 may receive temperature data for respective scenes included in the video data, and the temperature data may be received from a thermal imaging sensor B1 or a temperature generation model B2.

The thermal imaging sensor B1 may be synchronized with the video capturing device A to capture the same scene as the video capturing device A. That is, when an actual video is captured, temperature inside the capturing scene is measured, and thus it is possible to generate accurate temperature data corresponding to the corresponding video data by using the thermal imaging sensor B1. It is illustrated that the thermal imaging sensor B1 is separated from the video capturing device A but can be implemented as an integrated form with the video capturing device A depending on an embodiment.

The temperature generation model B2 may be trained to generate temperature data corresponding to an input video, based on video analysis. That is, the temperature generation model B2 may extract features from the input video and generate temperature data corresponding to the corresponding input video through deep learning based on the corresponding features. Accordingly, the temperature generation model B2 may generate and provide temperature data for previously provided video data or may generate and provide corresponding temperature data from video data input in real time depending on an embodiment.

The temperature meta information generator 120 may divide each frame included in the video data into sections, configure representative temperature of the sections, based on temperature data distributed within the sections, and generate temperature meta information. The temperature data indicates temperature in units of pixels, and the amount of data to be transmitted may be too large to transmit all the temperature data along with the video data. Accordingly, after dividing each frame included in the video data into the sections, the temperature meta information generator 120 may configure representative temperature for each section and reduce data throughput.

Figure 2:
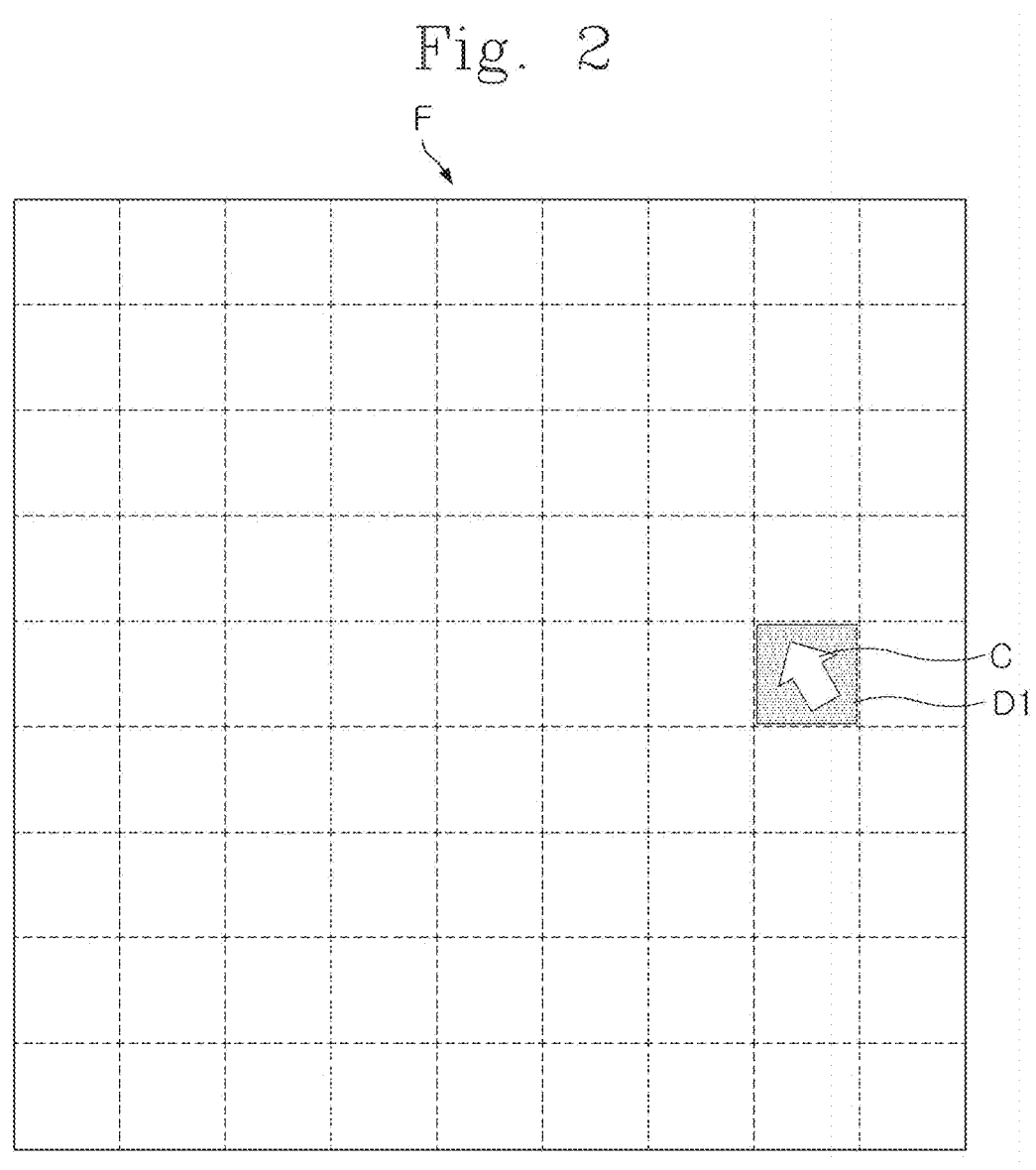
FIG. 2 is a schematic diagram illustrating a main section according to an embodiment of the present disclosure.

Specifically, the temperature meta information generator 120 may divide one frame into 9×9 sections as illustrated in FIG. 2. Thereafter, it is possible to extract temperature data of pixels included in each section and configure an average value thereof as representative temperature of the corresponding section. However, the present disclosure is not limited thereto, and the representative temperature for the corresponding section may be configured in various methods of the representative temperature to a maximum value or a minimum value within the corresponding section depending on an embodiment.

Further, the temperature meta information generator 120 may sample the video data at every configured periods and generate temperature meta information for sampled frames. That is, generating temperature meta information for all the frames included in the video data may result in an excessively large amount of data and may be an unnecessary task. Accordingly, it is possible to reduce the amount of transmitted data by sampling the frames at every regular periods and providing temperature meta information for the sampled frames.

The temperature meta information generated by the temperature meta information generator 120 may include representative temperature of the corresponding section, a sequence number, size information of the section, generation time information, and the like. The sequence number is to distinguish each section included in one frame, and may be sequentially assigned to each section in the frame in order to identify whether there is an omitted section. For example, the sequence number may be sequentially configured from 0 to 255, the generation time information may include the year, month, day, hour, minute, and second of the corresponding frame to be synchronized with the video data, and the size information may be indicated by the width and the height of the corresponding section.

Additionally, the temperature meta information generator 120 may receive user's selection location information corresponding to the corresponding video data. That is, the user may view a scene shown in the video data through a video reproduction device 200 and move a selection means such as a pointer to a specific location within the corresponding scene. For example, the user may wear a separate touch reproduction device and may receive a touch such as corresponding temperature from the touch reproduction device, based on temperature data corresponding to the location of the pointer displayed in the video reproduction device 200.

In this case, the temperature meta information generator 120 may receive selection location information indicating the location of the selection means such as the pointer selected by the corresponding user from the video reproduction device 200 and specify an active section corresponding to the selection location information among a plurality of sections, based thereon. At this time, the temperature meta information generator 120 may additionally divide the corresponding active section into a plurality of sub sections. That is, in order to provide more subdivided temperature information, the active section in which the pointer of the user is located can be additionally divided into a plurality of sub sections.

For example, as illustrated in FIG. 2, one sampled frame in the video data may be divided into a plurality of sections. That is, the frame may be divided into 9×9 sections, and each section may correspond to a main section. Referring to FIG. 2, the pointer C of the user may be displayed, and the user may move the pointer c to the location where the user desires. A section in which the pointer C is located corresponds to an active section D1, and the active section D1 may be divided again into a plurality of sub sections in order to provide more detailed temperature for the active section D1. At this time, it is possible to identify temperature distribution, based on the standard deviation of temperature data included in the active section D1 and divide the active section into sub sections according to the temperature distribution within the active section D1. For example, when there is temperature data having large difference from average temperature, based on z-score, the corresponding section may be divided into sub sections.

Figure 3A:
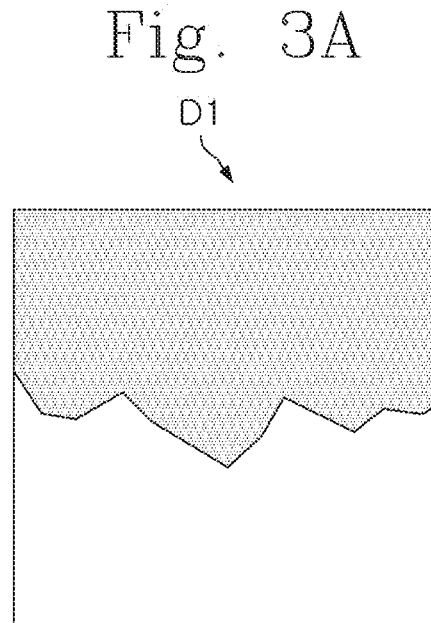
FIG. 3A is a schematic diagram illustrating distribution of temperature data within the active section according to an embodiment of the present disclosure.
Figure 3B:
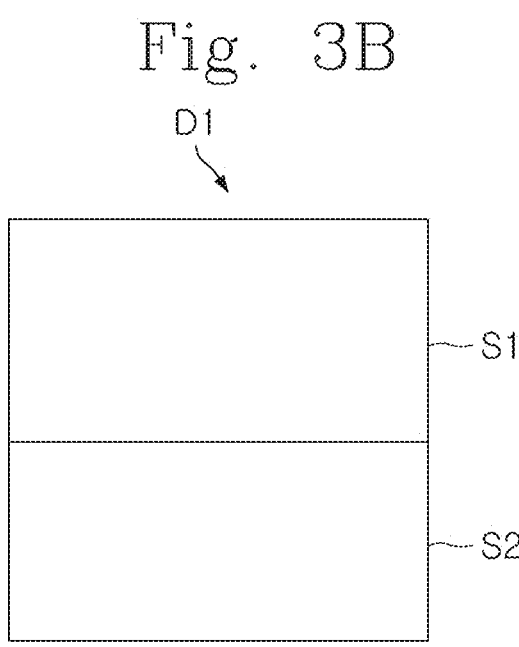
FIG. 3B is a schematic diagram illustrating sub sections of the active section according to an embodiment of the present disclosure.

Specifically, FIG. 3A illustrates distribution of temperature data within the active section D1, and pixels having z-score larger than or equal to 121 may be displayed as hatching. That is, in FIG. 3A, it may be identified that distribution of the temperature data is divided into upper and lower parts, the upper part has difference in 2 degrees or more from the average temperature, and the lower part has temperature close to the average temperature. Accordingly, as illustrated in FIG. 3B, the upper part and the lower part of the active section D1 may be divided into sub areas S1 and S2, and representative temperature may be configured for each of the sub areas S1 and S2. That is, representative temperature for each sub section may be additionally configured and inserted into the temperature meta information.

Although the case where the temperature distribution is divided into upper and lower parts is described as an example in FIG. 3, the temperature distribution may be divided into left and right parts depending on an embodiment in which case the sub areas S1 and S2 can be divided into two areas corresponding to the left and right parts. Further, when only z-score of the middle part in the active section D1 is different, the active section D1 may be divided into three equal parts to distinguish sub areas. In addition, the plurality of sub areas S1 and S2 can be configured through various methods in consideration of temperature distribution within the active section D1. According to an embodiment, it is possible to further divide the section by identifying temperature distribution within each of the sub areas S1 and S2.

Meanwhile, although FIG. 2 illustrates that the number of active sections D1 corresponding to the pointer C is one, the pointer C may span a plurality of main sections depending on an embodiment, in which case all main sections where the corresponding pointer C spans may be configured as the active section D1. In addition, an embodiment in which a plurality of main sections included within a configuration range from the main section in which the pointer C is located is configured as the active section is also possible.

Additionally, the temperature meta information generator 120 may maintain the sub sections S1 and S2 of the active section D1 for a predetermined time. That is, since the sections are designated as the active section D1 by the pointer C of the user, the internal sub sections S1 and S2 may be maintained until the corresponding active section D1 has a value similar to representative temperature of other adjacent main sections. For example, when an average value of differences between the representative temperature of the active section D1 and the representative temperature of other sections adjacent to the corresponding active section D1 is larger than or equal to a configured value, the sub sections S1 and S2 within the corresponding active section D1 may be continuously maintained and, when the corresponding average value becomes smaller than the configured value later, the sub sections within the corresponding active section D1 may be integrated and converted back into one main section.

The video compressor 130 may generate video streams by performing compression to further include temperature meta information into each frame within the video data. Specifically, the video compressor 130 may perform video compression based on moving picture expert group (MPEG)-2 transport stream (TS), in which case the video stream may be generated by further including the temperature meta information into a packetized elementary stream (PES) data area. For example, the video compressor 130 may assign a preset packet identification (PID) number to temperature meta information and store the same in the data area of PES. At this time, generation time information included in the temperature meta information may be converted into packet time stamp (pts) information, and the remaining representative temperature values, sequence numbers, and size information may be stored in the PES data area.

Figure 4:
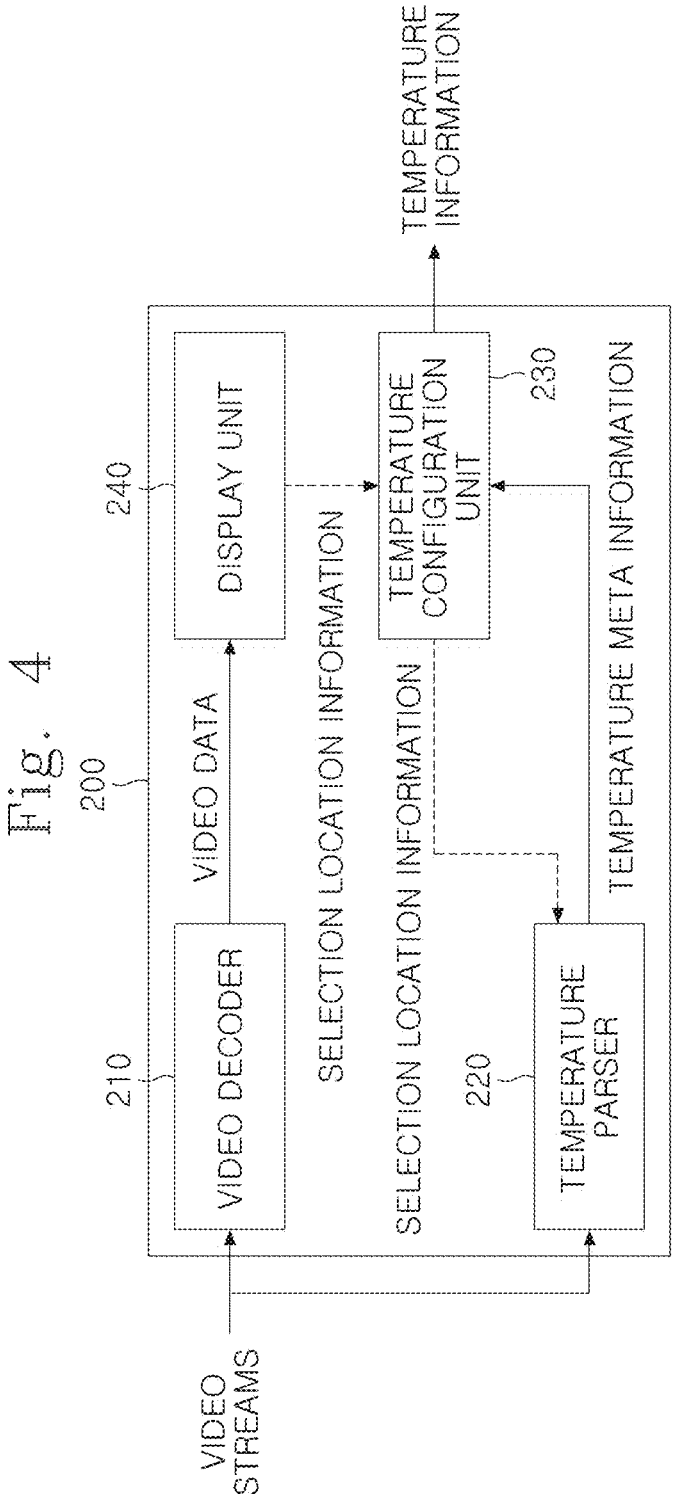
FIG. 4 is a schematic diagram illustrating a video reproduction device according to an embodiment of the present disclosure.

FIG. 4 is a schematic diagram illustrating a video reproduction device according to an embodiment of the present disclosure.

Referring to FIG. 4, a video reproduction device 200 according to an embodiment of the present disclosure may include a video decoder 210, a temperature parser 220, a temperature configuration unit 230, and a display unit 240.

Hereafter, the video reproduction device according to an embodiment of the present disclosure is described with reference to FIG. 4.

The video decoder 210 may receive video streams generated by the video stream generation device 100 through a wired or wireless communication network and decode video data from the received video streams. Thereafter, the video decoder 210 may provide the decoded video data to the display unit 240.

The temperature parser 220 may receive the video streams generated by the video stream generation device 100 and extract temperature meta data corresponding to the corresponding video data from the video streams. The video streams are compressed based on MPEG-2 TS, and thus the temperature parser 220 may extract temperature meta information by performing parsing with a PES demux filter by using a preset PID.

The temperature parser 220 may compare pts for the current video data with pts of the corresponding temperature meta information in order to synchronizer the video data and the temperature meta information. For example, when the extracted temperature meta information is past temperature meta information within a valid reference time, the temperature meta information may match the corresponding video data to be synchronized. On the other hand, when the extracted temperature meta information is past temperature data that having passed the valid reference time, the temperature meta information is discarded without being used. When the extracted temperature meta information corresponds to future temperature meta information compared to the current video data, the temperature meta information may match the corresponding video data to be used after waiting until the corresponding time.

Meanwhile, when temperature meta information for the corresponding video data is omitted, temperature within the video data may be randomly configured. For example, when initial temperature within the video data is not configured, temperature of a room temperature object (for example, 25 degrees) may be configured as a default value. When the following temperature meta information is continuously omitted after the initial temperature within the corresponding video data is configured, the temperature may be configured to gradually change from the initial temperature to the temperature of the room temperature object (for example, 25 degrees). For example, in the case of an object of 100 degrees, the temperature may be configured to gradually drops such that the temperature is 95 degrees after 1 second, 90 degrees after 2 seconds, . . . , 25 degrees after 15 seconds, and when the temperature meta information is continuously omitted thereafter, the temperature may be maintained as 25 degrees corresponding to the temperature of the room temperature object.

The temperature configuration unit 230 may receive selection location information selected by the user through a selection means such as a pointer, extract temperature meta information for a section corresponding to the corresponding selection location information from the temperature parser 220, generate temperature information corresponding to the corresponding selection location, and provide the same to the user. That is, temperature information may be provided to a touch reproduction device which the user is wearing to allow the user to feel temperature for a specific location in the video data.

The selection location information may be two-dimensional coordinate information in the video data, and the temperature configuration unit 230 may generate temperature information corresponding to the corresponding selection location information from the representative temperature value of the corresponding section extracted from the temperature meta information and provide the temperature information to the user. The temperature configuration unit 230 may provide the representative temperature value included in the temperature meta information to the user without any change, but may appropriately control the representative temperature value included in the temperature meta information and then provide the controller representative temperature value to the user depending on an embodiment.

Specifically, the temperature configuration unit 230 may configure the temperature upper limit and lower limit so that the temperature provided to the user through the touch can be controlled to a level that does not cause stress to the user's body. Further, when the representative temperature value corresponding to the pointer that the user moves rapidly changes within a short time, intermediate temperature may be additionally generated. That is, when the pointer is maintained at the corresponding selection location for a reference time or longer, intermediate temperature may be added to slowly increase the temperature rather than rapidly increasing the temperature of the corresponding selection location.

For example, even when the user burns his/her hand on an area that reaches hundreds of degrees such as wood fire, the temperature may slowly become hot by adding intermediate temperature rather than rapidly changing the temperature from the room temperature to temperature of the wood fire. Further, when the user takes his/her hand out of the hot water, temperature information may be configured to keep the hand warm for a predetermined time rather than directly changing the temperature to the room temperature. Further, when cold temperature such as ice changes to hot temperature such as a heater, it can be made to gradually change the temperature to the hot temperature again via the room temperature.

In addition, the temperature configuration unit 230 may further include additional tactile information other than temperature information and provide the tactile information to the user in order to indicate very hot or cold temperature. That is, in the case of very hot or cold temperature, the corresponding temperature cannot be actually reproduced and provided to the user, and thus it is possible to make the user more realistically feel the temperature by adding and providing tactile sensation such as vibration or pressure along with the upper or lower temperature.

The display unit 240 may be a device such as television showing a video through vision and hearing. When the user moves the selection means such as the pointer in accordance with a scene within the video data, the display unit 240 may generate selection location information of the corresponding selection means, and the generated selection location information may be provided to the temperature configuration unit 230. However, depending on an embodiment, an input device such as a mouse, a keyboard, or a touch pad separately provided from the display unit 240 may be further included, and the user may move the selection means by using the input device. In this case, the temperature configuration unit 230 may receive the corresponding selection location information from the input device.

FIG. 5 is a block diagram illustrating an example of a computing environment 10 including a computing device suitable to be used in exemplary embodiments. In the illustrated embodiments, respective components may have different functions and capabilities as well as those described below, and additional components may be included as well as the components described below.

The illustrated computing environment 10 includes a computing device 12. In an embodiment, the computing device 12 may be the video stream generation device 100 or the video reproduction device 200 according to embodiments of the present disclosure. The computing device 12 includes at least processor 14, a computer-readable storage medium 16, and a communication bus 18. The processor 14 may allow the computing device 12 to operate according to the above-described exemplary embodiments. For example, the processor 14 may execute one or more programs stored in the computer-readable storage medium 16. The one or more programs may include one or more computer-executable instructions, and the computer-executable instructions may be configured to, when executed by the processor 14, allow the computing device 12 to perform operations according to exemplary embodiments.

The computer-readable storage medium 16 is configured to store computer-executable instructions, program codes, program data, and/or other suitable type information. The programs stored in the computer-readable storage medium 16 includes a set of instructions executable by the processor 14. In an embodiment, the computer-readable storage medium 16 may be a memory (volatile memory such as a random access memory, non-volatile memory, or an appropriate combination thereof), one or more magnetic disk storage devices, optical disk storage devices, flash memory devices, other types of storage media accessed by the computing device 12 and capable of storing desired information, or an appropriate combination thereof.

The communication bus 18 includes the processor 14 and the computer-readable storage medium 16 to mutually connect various different components of the computing device 12.

The computing device 12 may include one or more input and output interfaces 22 and one or more network communication interfaces 26 that provide one or more interfaces for an input and output device 24. The input and output interfaces 22 and the network communication interfaces 26 are connected to the communication bus 18. The input and output device 24 may be connected to other components of the computing device 12 through the input and output interfaces 22. The exemplary input and output device 24 may include input devices such as a pointing device (a mouse or a track pad), a keyboard, a touch input device (a touch pad or a touch screen), a voice or sound input device, various types of sensor devices, and/or a capturing device, and/or output devices such as a display device, a printer, a speaker, and/or a network card. The exemplary input and output device 24 may be included within the computing device 12 as a component constituting the computing device 12 or may be connected to the computing device 12 as a separate device distinguished from the computing device 12.

FIG. 6 is a flowchart illustrating a video stream generation method according to an embodiment of the present disclosure. Each step of FIG. 6 may be performed by the video stream generation device according to an embodiment of the present disclosure.

Referring to FIG. 6, the video stream generation device may receive video data and temperature data for scenes included in the corresponding video data in S110. That is, the video stream generation device may receive the temperature data corresponding to the corresponding video data along with the video data to generate video streams.

The video stream generation device may receive video data from a video capturing device and receive temperature data from a thermal imaging sensor or a temperature generation model. The thermal imaging sensor may be synchronized with a video capturing device and may capture the same scene as the video capturing device. The thermal imaging sensor may be implemented in an integrated form with the video capturing device. The temperature generation model may be trained to generate temperature data corresponding to an input video, based on video analysis. The temperature generation model may generate and provide temperature data on previously provided video data or may generate and provide corresponding temperature data from video data input in real time.

Thereafter, the video stream generation device may divide each frame included in the video data into sections, configure representative temperature of the sections, based on temperature data distributed within the sections, and generate temperature meta information in S120. The temperature data indicates temperature in units of pixels, and the amount of data to be transmitted may be too large to transmit all the temperature data along with the video data. Accordingly, after dividing each frame included in the video data into the sections, video stream generation device may configure representative temperature for each section and reduce data throughput.

Further, the video stream generation device may sample the video data at every configured periods and generate temperature meta information for sampled frames. That is, it is possible to reduce the amount of transmitted data, by sampling the frames at every periods and providing temperature meta information for the sampled frames. The temperature meta information generated by the video stream generation device may include representative temperature of the corresponding section, a sequence number, size information of the section, and generation time information.

In addition, the video stream generation device may receive selection location information of the user corresponding to the corresponding video data. For example, the user may be wearing a separate touch reproduction device and may receive a touch such as corresponding temperature from the touch reproduction device, based on temperature data corresponding to the location of the pointer displayed in the video reproduction device. In this case, the video stream generation device may receive selection location information indicating the location of the selection means such as the pointer selected by the corresponding user from the video reproduction device and specify an active section corresponding to the selection location information among a plurality of sections, based thereon. At this time, the video stream generation device may additionally divide the corresponding active section into a plurality of sub sections. That is, in order to provide more subdivided temperature information, the active section in which the pointer of the user is located can be additionally divided into a plurality of sub sections. For example, temperature distribution may be identified based on standard deviation of temperature data included in the active section, and sub sections may be divided according to temperature distribution within the active section. Depending on an embodiment, when there is temperature data having large difference from average temperature, based on z-score, the corresponding section may be divided into sub sections. Thereafter, the video stream generation device may additionally configure representative temperature for each sub area and include the same in temperature meta information.

In addition, the video stream generation device may maintain sub sections within the active section configured by the user for a predetermined time. That is, since the active section is determined by the pointer designated by the user, the internal sub sections may be maintained until the corresponding active section has a similar value to representative temperature of other adjacent main sections. For example, when an average value of differences between the representative temperature of the active section and the representative temperature of other sections adjacent to the corresponding active section is larger than or equal to a configured value, the sub sections within the corresponding active section may be continuously maintained and, when the corresponding average value becomes smaller than the configured value later, the sub sections within the corresponding active section may be integrated and converted back into one main section.

Thereafter, the video stream generation device may generate the video stream by performing compression such that temperature meta information is included in each frame within the video data. Specifically, the video stream generation device may perform video compression based on moving picture expert group (MPEG)-2 transport stream (TS), in which case the video stream may be generated by further including the temperature meta information into a packetized elementary stream (PES) data area. For example, the video stream generation device may assign a preset packet identification (PID) number to temperature meta information and store the same in the data area of PES. At this time, generation time information included in the temperature meta information may be converted into packet time stamp (pts) information, and the remaining representative temperature values, sequence numbers, and size information may be stored in the PES data area.

The present disclosure described below can be implemented as a computer-readable code in a medium recording a program. The computer-readable medium may continuously store a computer-executable program or may temporarily store the same for execution or download. Further, the medium may be various types of recording means or storage means in the form of a single hardware component or a combination of several hardware components, and may exist in a distributed form on the network without being limited to a medium directly accessing any computer system. Examples of the computer-readable medium may include magnetic media such as hard disks, floppy disks, and magnetic tapes, optical recording media such as a compact CD-ROM and a DVD, magneto-optical media such as floptical disks, and hardware devices such as a ROM, a RAM, and a flash memory, which are specially configured to store program instructions. Further, other examples of the medium may be a recording medium or a storage medium managed by an app store that circulates applications or sites or servers that supply or circulate various other software components. Accordingly, the above detailed description should be considered as examples rather than being restrictively construed in all aspects. The scope of the present disclosure should be determined by rational interpretation of the accompanying claims, and all modifications within the equivalent range of the present disclosure are included in the scope of the present disclosure.

The present disclosure is not limited by the above-described embodiments and the accompanying drawings. It is apparent to those skilled in the art to which the present disclosure pertains that substitutions, modifications, and changes may be made to the elements according to the present disclosure without departing from the technical idea of the present disclosure.

What is claimed is:

1. A video stream generation method of generating video streams capable of reproducing temperature of scenes within a video, the video stream generation method comprising:
   receiving video data and temperature data for scenes included within the video data;
   generating temperature meta information by dividing each frame included in the video data into sections and configuring representative temperature of the sections, based on the temperature data distributed within the sections; and
   generating video streams by performing compression such that each frame within the video data further includes the temperature meta information.

2. The video stream generation method of claim 1, wherein the receiving comprises receiving the temperature data from a thermal imaging sensor synchronized with a video capturing device for generating the video data and configured to capture identical scenes to the video capturing device.

3. The video stream generation method of claim 1, wherein the receiving comprises receiving the temperature data corresponding to the video data from a temperature generation model trained to generate temperature data corresponding to an input video, based on video analysis.

4. The video stream generation method of claim 1, wherein the generating of the temperature meta information comprises calculating an average value of temperature data corresponding to respective pixels within the section and configuring the average value as representative temperature of the section.

5. The video stream generation method of claim 1, wherein the generating of the temperature meta information comprises sampling the video data at every configured periods and generate the temperature meta information for sampled frames.

6. The video stream generation method of claim 1, wherein the temperature meta information further comprises at least one of a sequence number indicating the section, and size information and generation time information of the section.

7. The video stream generation method of claim 1, wherein the generating of the temperature meta information comprises:

receiving selection location information of a user, corresponding to the video data, and additionally dividing an active section corresponding to the selection location information among the sections into sub sections; and additionally configuring representative temperature for the sub sections to generate the temperature meta information.

8. The video stream generation method of claim 7, wherein the additionally dividing comprises identifying temperature distribution, based on standard deviation of temperature data included within the active section and dividing the sub sections according to the temperature distribution within the active section.

9. The video stream generation method of claim 7, wherein the additionally dividing comprises, in case that an average value of differences between representative temperature of the active section and representative temperature of other adjacent sections is larger than or equal to a configured value, maintaining the sub sections within the active section.

10. The video stream generation method of claim 1, wherein the generating of the video streams comprises generating the video streams by further including the temperature meta information in a packetized elementary stream (PES) data area, based on moving picture expert group (MPEG)-2 transport stream (TS).

11. A computer program including instructions encoded on a non-transitory computer readable medium executable by a processor to perform the video stream generation method of claim 1.

12. A video stream generation apparatus comprising a processor and configured to generate video streams capable of reproducing temperature of scenes within a video, wherein the processor is configured to:

receive video data and temperature data for scenes included within the video data;

generate temperature meta information by dividing each frame included in the video data into sections and configuring representative temperature of the sections, based on the temperature data distributed within the sections; and generate video streams by performing compression such that each frame within the video data further includes the temperature meta information.

* * * * *